(12) United States Patent
Warfen et al.

(10) Patent No.: US 9,309,866 B2
(45) Date of Patent: Apr. 12, 2016

(54) BLADE ANGLE ADJUSTMENT RATE LIMIT ADJUSTMENT

(75) Inventors: Karsten Warfen, Sohren (DE); Henning Leweke, Osnabruck (DE)

(73) Assignee: SENVION SE, Hamburg (DE)

( * ) Notice: Subject to any disclaimer, the term of this patent is extended or adjusted under 35 U.S.C. 154(b) by 1403 days.

(21) Appl. No.: 12/920,978

(22) PCT Filed: Feb. 23, 2009

(86) PCT No.: PCT/EP2009/001267
§ 371 (c)(1),
(2), (4) Date: Sep. 3, 2010

(87) PCT Pub. No.: WO2009/109309
PCT Pub. Date: Sep. 11, 2009

(65) Prior Publication Data
US 2011/0037263 A1      Feb. 17, 2011

(30) Foreign Application Priority Data

Mar. 6, 2008   (DE) .................. 10 2008 012 956

(51) Int. Cl.
*F03D 7/02* (2006.01)
(52) U.S. Cl.
CPC ......... *F03D 7/0224* (2013.01); *F05B 2270/304* (2013.01); *Y02E 10/721* (2013.01); *Y02E 10/723* (2013.01)
(58) Field of Classification Search
USPC ......... 290/44, 55; 415/1; 416/1, 9, 27, 37, 26, 416/31, 40, 41, 43, 44
See application file for complete search history.

(56) References Cited

U.S. PATENT DOCUMENTS

| 4,193,005 A | * | 3/1980 | Kos et al. ................. 290/44 |
| 6,137,187 A | * | 10/2000 | Mikhail et al. ............ 290/44 |

(Continued)

FOREIGN PATENT DOCUMENTS

| DE | 10141098 | 3/2003 |
| DE | 102005034899 | 2/2007 |

(Continued)

OTHER PUBLICATIONS

Translation of Nim (WO 2007138138) provided by Espacenet.*
Translation of Wakasa et al. provided by Espacenet.*

*Primary Examiner* — Dwayne J White
*Assistant Examiner* — Justin Seabe
(74) *Attorney, Agent, or Firm* — Rankin, Hill & Clark LLP

(57) ABSTRACT

A method for the operation of a wind power plant (11) with a rotor (9), which has at least one rotor blade (10), wherein at least one part of the rotor blade (10) will be or is rotated around a longitudinal axis of the rotor blade (10) by a blade angle ($\vartheta$) wherein the rotation of the at least one part of the rotor blade (10) occurs with a pre-settable blade angle adjustment rate ($\dot{\theta}$), wherein the rotor (9) is operated speed variably and wherein the blade angle adjustment rate ($\dot{\vartheta}$) is restricted by a pre-settable blade angle adjustment rate limit (G, G', G1-G4). Furthermore, a wind power plant (11) with a rotor (9), which receives at least one rotor blade (10), wherein at least one part of the rotor blade (10) is rotatable around a longitudinal axis of the rotor blade (10) by a blade angle ($\vartheta$), wherein a blade angle adjustment rate is pre-settable and the blade angle adjustment rate ($\dot{\vartheta}$) is restricted by a blade angle adjustment rate limit (G, G', G1-G4).

24 Claims, 4 Drawing Sheets

(56) References Cited

U.S. PATENT DOCUMENTS

| | | |
|---|---|---|
| 2003/0075929 A1 | 4/2003 | Weitkamp |
| 2003/0127862 A1 | 7/2003 | Weitkamp |
| 2004/0094964 A1* | 5/2004 | Mikhail et al. ............... 290/44 |
| 2006/0002797 A1 | 1/2006 | Moroz |
| 2008/0101915 A1 | 5/2008 | Harms |
| 2008/0206051 A1* | 8/2008 | Wakasa et al. ............... 416/41 |
| 2008/0290664 A1 | 11/2008 | Kruger |
| 2008/0303281 A1 | 12/2008 | Krueger |
| 2009/0295161 A1 | 12/2009 | Steiner |

FOREIGN PATENT DOCUMENTS

| | | |
|---|---|---|
| DE | 102006001613 | 1/2008 |
| DE | 102006051352 | 4/2008 |
| DE | 102007026995 | 1/2010 |
| EP | 0942168 | 9/1999 |
| WO | WO 2005083266 A1 * | 9/2005 |
| WO | 2006007838 | 1/2006 |
| WO | WO 2007138138 A1 * | 12/2007 |
| WO | 2009010059 | 1/2009 |

* cited by examiner

BLADE ANGLE ADJUSTMENT RATE LIMIT ADJUSTMENT

BACKGROUND OF THE INVENTION

1. Field of the Invention

The invention relates to a method for the operation of a wind power plant with a rotor, which has at least one rotor blade, wherein at least one part of the rotor blade will be or is rotated around a longitudinal axis of the rotor blade by a blade angle, wherein the rotation of the at least one part of the rotor blade occurs with a pre-settable blade angle adjustment rate, wherein the rotor is operated speed variably and wherein the blade angle adjustment rate is restricted by a pre-settable blade angle adjustment rate limit. Furthermore, the invention relates to a wind power plant with a rotor, which accommodates at least one rotor blade, wherein at least one part of the rotor blade is rotatable around a longitudinal axis of the rotor blade by a blade angle, wherein a blade angle adjustment rate is pre-settable and the blade angle adjustment rate is restricted by a blade angle adjustment rate limit.

2. Description of Related Art

Corresponding methods for the operation of a wind power plant and corresponding wind power plants are generally known. For example, DE 10 2006 001 613 B4 of the applicant is referred to in this respect.

When methods for the operation of wind power plants and corresponding wind power plants are concerned, the problem can occur that the regulation or control of the operating control spontaneously adjusts the blade angle of the rotor blade or a part of the rotor blade towards 0°, whereby excessive loads or rotational speeds can occur. A blade angle of 0° corresponds hereby with an operating position of the rotor blade, in which maximum power is generated when there is wind. In contrast to this, the feathering position should be mentioned, which is approx. 90°. No more power is transferred to the rotor in the feathering position.

BRIEF SUMMARY OF THE INVENTION

The object of the present invention is to provide a method for the operation of a wind power plant and a corresponding wind power plant as well as a control or regulation device of a wind power plant, by means of which operating loads can be reduced, in particular by means of which excess loads or rotational speeds are prevented through faulty control or regulation of the operating control, which spontaneously rotates the blade angle towards 0°.

This object is solved by a method for the operation of a wind power plant with a rotor, which has at least one rotor blade, wherein at least one part of the rotor blade will be or is rotated around a longitudinal axis of the rotor blade by a blade angle, wherein the rotation of the at least one part of the rotor blade occurs with a pre-settable blade angle adjustment rate, wherein the rotor is operated speed variably and wherein the blade angle adjustment rate is restricted by a pre-settable blade angle adjustment rate limit, which is further characterized in that a variable blade angle adjustment rate limit is provided, which is adjusted depending on at least one operating parameter of the wind power plant, in particular depending on the rotor rotational speed and/or at least one environmental parameter.

Through the provision of a variable blade angle adjustment rate limit, which is adjusted depending on at least one operating parameter of the wind power plant and/or at least one environmental parameter, wherein it is particularly preferred to provide the dependency on the rotor rotational speed, the blade angle adjustment rate (pitch rate) of the rotational speed increase, which is determined by the moment of inertia and the supplied power, is adjusted in contrast to the state of the art, in which the limit is a permanently pre-set constant control parameter of the operating control. In the case of a negative pitch rate in particular, it remains throttled for a correspondingly long period of time so that a massive load case, reducing the lifespan of the wind power plant, can no longer occur through critical blade angle adjustment rates.

Within the framework of the invention, operating parameters are in particular parameters that are directly or indirectly related to the rotational speed, such as in particular the rotational speed itself, the power, the generator torque, the blade angle or respectively a blade angle or the load of the wind power plant. Within the framework of the invention, environmental parameters considered to be advantageous are in particular the wind speed, the wind direction, a wind gradient, the angle of a cross wind of the rotor, the air density, a turbulence on the wind power plant and/or in the vicinity of the wind power plant.

The speed variable operation of the rotor preferably includes that, in an especially preferred embodiment, the wind power plant can be permanently operated in a rotational speed range of more than 5% below the synchronous rotational speed of the generator.

Within the framework of the invention, the synchronous rotational speed represents the quotient of the network frequency f and the number of pole pairs p/2 of the generator. In the case of a 4-pole generator (that is with two pole pairs), a synchronous rotational speed $n_{syn}=f\times 60/(p/2)=1500$ rpm results e.g. in the German 50 Hz network. In the case of a synchronous machine with full converter, synchronous rotational speed should be understood in particular as the network synchronous rotational speed, in which the excitation of the machine is operated with the network frequency.

The variable blade angle adjustment rate limit is preferably adjusted in a hub regulation or control device depending on the rotor rotational speed. The absolute value of the permitted blade angle adjustment rate during the adjustment of the blade angle is preferably reduced towards 0°. A corresponding blade angle adjustment rate is then a negative blade angle adjustment rate, the absolute value of which is reduced.

The blade angle adjustment rate limit is preferably determined before or with its adjustment. Blade angle adjustment rate limits which are otherwise potentially undefined are prevented by the determination.

A variable blade angle adjustment rate limit is preferably provided for a negative blade angle adjustment rate.

It is preferred that a first variable blade angle adjustment rate limit is provided for a positive blade angle adjustment rate and a second variable blade angle adjustment rate limit is provided for a negative blade angle adjustment rate. In particular the dynamics of the blade angle adjustment are hereby adjustable to the corresponding conditions. It is then, in particular, possible to react very quickly to negative wind gusts.

The method is preferably used in a range of reduced rotational speed and in particular preferably in the partial load range. The absolute values of the first and the second variable blade angle adjustment rate limit are preferably different at the same rotational speed of the rotor.

In the case of negative blade angle adjustment rates, a characteristic line of the blade angle adjustment rate limit is preferably provided depending on the rotational speed at which a highest blade angle adjustment rate limit is provided below a pre-settable lower rotational speed threshold and a lowest blade angle adjustment rate limit is provided above a pre-settable upper rotational speed threshold, wherein a constant characteristic line is provided between the highest and the lowest blade angle adjustment rate limit. The method of operation is hereby always in a defined state.

A linear and/or quadratic characteristic line is preferably provided between the highest and the lowest blade angle adjustment rate limit or there is a linear and/or quadratic portion in the characteristic line. An adjustment for the corresponding wind power plant or the location of the wind power plant can hereby be provided. The selection of the characteristic line can be selected depending on environmental conditions such as temperature or humidity. For example, it can be provided at lower rotational speeds that the characteristic line has a transition from a pre-settable upper blade angle adjustment rate limit at negative blade angle adjustment rates in a direction that is relatively smooth at higher rotational speeds. Thus, it is regulated or controlled with a negative slope towards lower blade angle adjustment rate limits.

A rotational speed capturing is preferably performed in a rotor hub of the wind power plant. The rotational speeds can hereby be fed to a control or regulation device arranged in or on the rotor hub to control or regulate the blade angle adjustment rates. The rotational speed capturing performed in the rotor hub, or respectively the rotational speed capturing provided on the rotor hub, is preferably in addition to a rotational speed capturing performed via the operating control. In this case, the corresponding rotational speeds can also be compared so that an error message is provided in the case of a pre-settable difference in the rotational speed.

The rotor rotational speed used to determine the variable blade angle adjustment rate limit is preferably filtered. For example, an average value of a pre-settable number of measurement values can be formed for this. Moreover, a temporal filtering can be performed in addition or alone, for example via a generally known PT1 element.

For the measurement of the rotational speed and further determination of the rotational speed, patent application DE 10 2007 026 995.3 of the applicant is referenced in particular. The disclosure of this patent application should be entirely contained in the present patent application.

The highest blade angle adjustment rate limit in terms of absolute values, in particular the overall smallest blade angle adjustment rate limit in the case of negative blade angle adjustment rates, preferably lies between 3% through 15%, in particular 5% through 10%, below the nominal rotational speed of the wind power plant and towards higher rotational speeds. The upper rotational speed for the characteristic line, at which the blade angle adjustment rate limit is reached, thus lies in a range from 3% through 15%, in particular 5% through 10%, below the nominal rotational speed. In the case of non-throttled operation with sufficient wind, the dynamic range of the regulation of the wind power plant is not negatively impacted by means of the operating control through the method according to the invention.

A supplementary measure is preferably provided, which restricts or lowers the value of slope or respectively of the adjustment rate of the blade angle adjustment rate limit. This preferably concerns a type of ramp, which ensures, in particular in the case of quick rotational speed changes, that the blade angle adjustment rate limit determined via a characteristic line is not directly the current blade angle adjustment rate limit, but rather a value that lies between this blade angle adjustment rate limit determined from the characteristic line and a previous blade angle adjustment rate limit.

In the case of a deviation of the rotational speed from a nominal rotational speed, in particular a shortfall of the nominal rotational speed, the blade angle adjustment rate limit is preferably adjusted without causing a reduction in the rotational speed deviation. The wind power plant can hereby continue to be operated in a desired operating mode. In the case of a deviation of the rotational speed from a nominal rotational speed, in particular a shortfall of the nominal rotational speed, the blade angle adjustment rate limit is preferably adjusted such that the permissible blade angle adjustment rate for reaching the nominal rotation speed is limited or restricted.

Furthermore, the object is solved through a wind power plant with a rotor, which has at least one rotor blade, wherein at least one part of the rotor blade is rotatable around a longitudinal axis of the rotor blade by a blade angle, wherein a blade angle adjustment rate is pre-settable and the blade angle adjustment rate is restricted by a blade angle adjustment rate limit, which is further characterized in that a control or regulation device is provided for the blade angle adjustment rate, in which the blade angle adjustment rate limit is provided as a variable blade angle adjustment rate limit, which will be or is adjusted depending on the rotor rotational speed.

In the case of the control or regulation device, it can be a control or regulation device supplementing the operating control. Parts of the method according to the invention can also be performed in the operating control and other parts in the control or regulation device. The control or regulation device can also be completely integrated in the operating control, wherein it is preferred that at least the rotational speed capturing occurs in or on the hub. The control or regulation device preferably has a blade angle adjustment rate limit determination device. The blade angle adjustment rate limit determination device can also be a module, which is integrated in particular in the control or regulation device. It can also be an algorithm provided in the control or regulation device.

The blade angle adjustment rate limit determination device preferably has a characteristic line of the blade angle adjustment rate limit depending on the rotational speed of the wind power plant. The characteristic line is preferably stored in the control or regulation device or will be interpolated based on pre-settable parameters. The characteristic line can also be calculated. For example, the characteristic line can be partially linear and can have a quadratic term and/or a cubic term.

A rotational speed capturing device is preferably provided, which is arranged in particular in or on the rotor hub. Furthermore, a filter is preferably provided for a measured rotor rotational speed. An adjustment module for the blade angle adjustment rate limit is also preferably provided, by means of which the amount of the increase in the blade angle adjustment rate is reducible and/or by means of which the value of the adjustment rate of the blade angle adjustment rate limit is reducible or restricted. It is hereby, in particular, the ramp already mentioned above or respectively the adjustment module has this ramp.

A control or regulation device of a wind power plant is preferably provided, with which a method according to the invention can be performed. Furthermore, a computer program with program code means, which are adjusted in order to execute the method according to the invention, is preferably provided when the computer program runs in particular in a control or regulation device of a wind power plant. The computer program according to the invention is preferably saved on a data carrier readable by a computer.

BRIEF DESCRIPTION OF THE DRAWINGS

The invention is described below, without restricting the general idea of the invention, based on exemplary embodiments in reference to the drawings, whereby explicit reference is made to the drawings with regard to the disclosure of all details according to the invention that are not explained in greater detail in the text. The drawings show in.

DETAILED DESCRIPTION OF THE INVENTION

In the following figures, the same or similar types of elements or respectively corresponding parts are provided with the same reference numbers in order to prevent the item from needing to be reintroduced.

A negative blade angle adjustment rate is defined as a rate for a blade angle adjustment in the direction from the feathering position towards 0° or the operating position of the rotor blade. The same applies accordingly for the blade angle adjustment rate limits. If the negative blade angle adjustment rate limit is −3.5°/s, that means that the rotor blade may be moved in the direction of 0° with a maximum adjustment rate of 3.5°/s, i.e. from the direction of the feathering position in the direction of the normal operating position.

Figure 1:
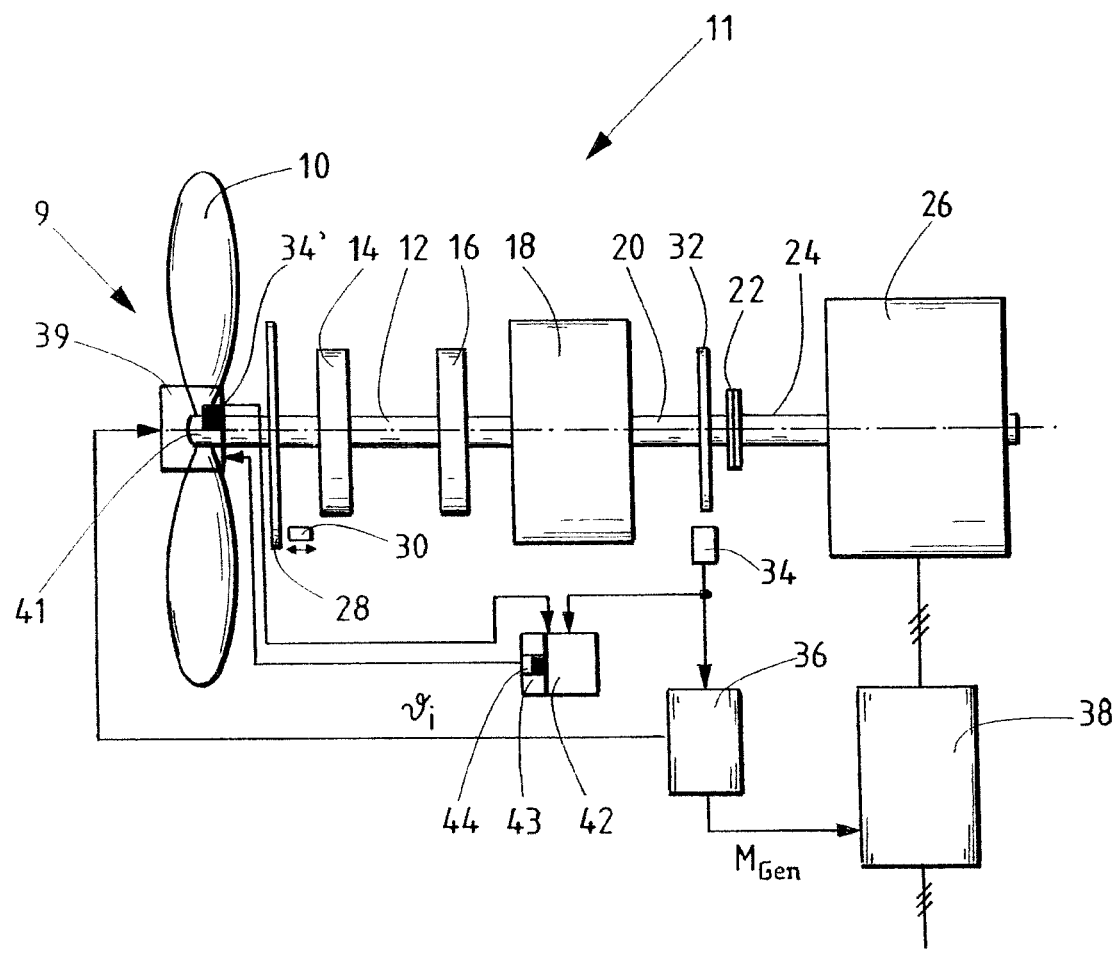
FIG. 1 a schematic representation of parts of a wind power plant.

FIG. 1 shows, schematically, important parts of the wind power plant 11 as a block diagram. A rotor 9 with rotor blades 10 of the wind power plant 11 is shown, wherein the rotor 9 turns with a rotational speed n. The rotor 9 has a shaft 12, which is mounted in two bearings 14 and 16. The shaft 12 is the input shaft of a gearbox 18 not described in greater detail, which transmits the rotational speed of the shaft to a higher rotational speed, for example by the factor 100. An output shaft of the gearbox 18 is coupled with a shaft 24 of a generator 26, particularly of an alternator 26, via a coupling 22. Between the wind rotor 9 and the first bearing 14, a locking disk 28 is arranged in a torque-proof manner on the shaft 12, which works together with a locking element 30. If the locking element 30 is inserted, for example, into an opening or recess in the locking disk 28, the rotation of the shaft 12 is thereby prevented.

A transmitter disk 32 is arranged in a torque-proof manner on the shaft section 20 near the coupling 22. It works together with a sensor arrangement 34, the signals of which are transmitted to a computer 36. As regulator, the computer 36 sends a torque control signal to a converter 38 for the alternating current created by the generator 26. The converter 38 creates alternating current with corresponding pre-settable parameters for the purpose of the feeding to a network.

The rotor 9 contains a blade angle adjustment device 39 for the blades 10 of the rotor 9. At least one control signal $\vartheta$ i is sent to the blade angle adjustment device 39 by the computer 36. In case of a rotor with two or more blades, one control signal can be created for each blade. The regulator or the controller is located, for example, on or in computer 36. The actual value of the rotational speed, which is determined via the sensor arrangement 34, is calculated in the computer 36 from the signals of the sensor arrangement 34 and can, for example, be compared with a nominal value for the rotational speed in order to determine at least one control signal $\vartheta$ i for the blade angle adjustment device 39.

According to the invention, the actual value of the rotational speed n or respectively the rotor rotational speed n can also serve as input for a control or regulation device 42 according to the invention, by means of which the method according to the invention can be performed. A blade angle adjustment rate limit G or G' as determined in the control or regulation device 42 is then fed to the blade angle adjustment device 39. For this, both a blade angle adjustment rate limit determination device 43 as well as an adjustment module 44, which will be described in greater detail with reference to the following figures, are provided in FIG. 1 in the control or regulation device 42. Alternatively, a measured rotor rotational speed n can also be fed to the control or regulation device 42 alone or in addition via the sensor arrangement 34', which is arranged on or in the hub 41 of the rotor 9. The devices 42, 43 and/or 44 are preferably integrated in the blade adjustment device 39.

Figure 2:
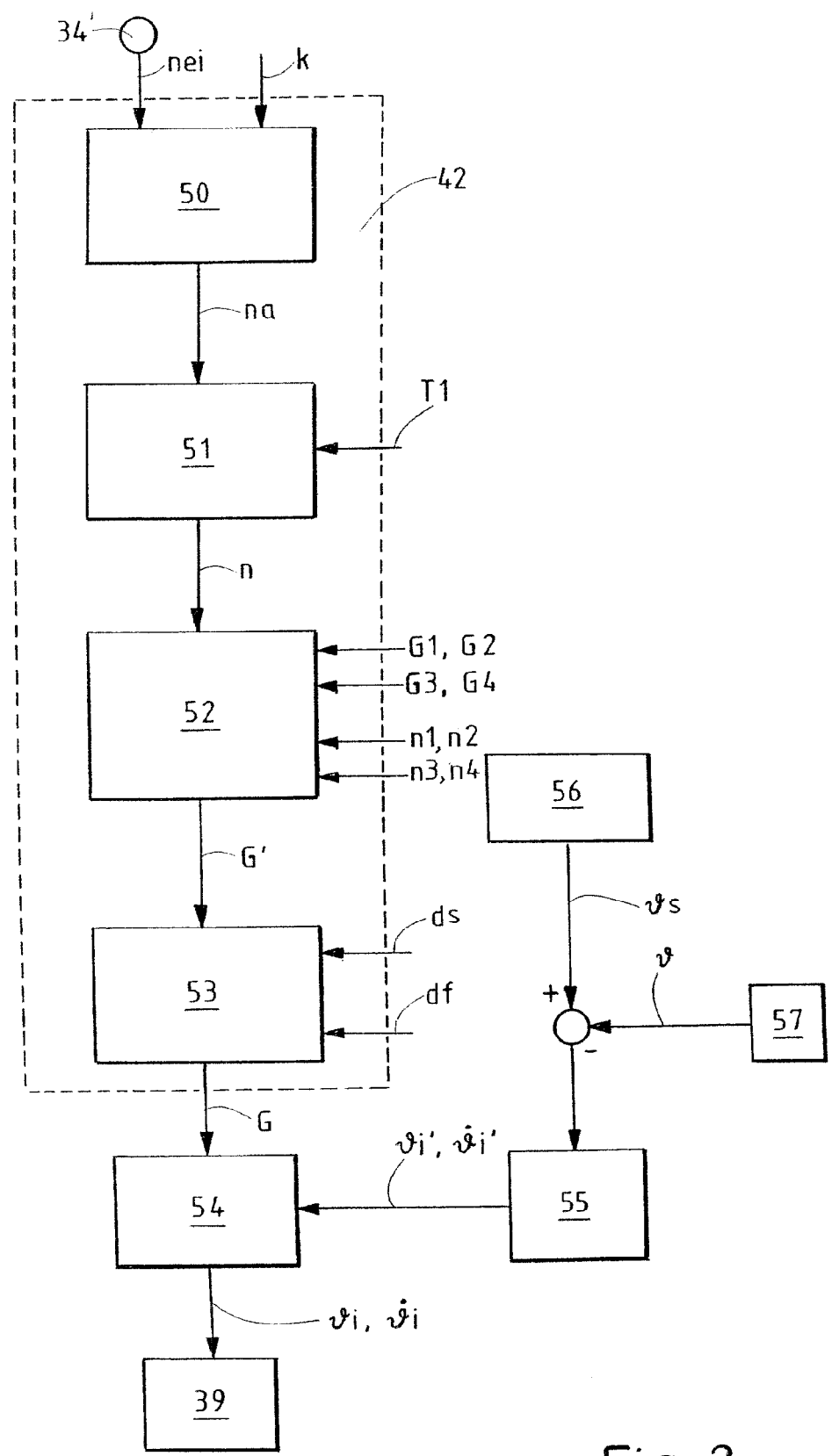
FIG. 2 a schematic block diagram for a method according to the invention.

FIG. 2 shows a schematic block diagram of a method according to the invention. A signal, which is provided for rotational speed calculation, is generated by the sensor arrangement 34', which is arranged, for example, on the hub 41 of the rotor 9 in FIG. 1. A pulse sensor is for example provided, which registers for example the pulses generated by 36 screws per revolution. The rotational speed is averaged from this, for example via the constant k, which can be set and represents a number (for example 6) of measurement values. The rotational speed calculation hereby results from an average value over k time intervals between the pulse ei−1 and pulse ei. This is carried out in the block 50 labeled rotational speed calculation. The output from the rotational speed calculation na represents an averaged rotational speed, which is provided as the input for the block rotational speed filter 51. In the rotational speed filter 51, the rotational speed is filtered, for example via a PT1 element, for example with the parameter T1 of 3.0 s. T1 can preferably lie in the range between 1 s and 5 s. The previously described rotational speed determination 50 or rotational speed calculation 50, respectively, can be part of an overspeed shutdown of the hub and queried in a 1 ms cycle.

The output of the rotational speed filter 51 represents the rotor rotational speed n, which serves as the input for the limit characteristic line 52. In the limit characteristic line 52, which is described in greater detail within the framework of FIGS. 3 through 5, a blade angle adjustment rate limit a is calculated for negative blade angle adjustment rate limits and for positive blade angle adjustment rate limits depending on the rotational speed n, depending on whether the blade angle adjustment rate is negative or positive. Both limits can in general also be calculated or determined.

In the block limit characteristic line 52 or respectively of the corresponding device, some parameters can be entered or respectively pre-set or respectively are stored accordingly. It hereby concerns an upper blade angle adjustment rate limit G1 for negative blade angle adjustment rates $\vartheta$, a lower blade angle adjustment rate limit G2 for negative blade angle adjustment rates $\vartheta$, an upper blade angle adjustment rate limit G3 for positive blade angle adjustment rates $\vartheta$ as well as a lower blade angle adjustment rate limit G4 for positive blade angle adjustment rates $\vartheta$. Moreover, the following parameters can be pre-set or respectively stored in the limit characteristic line, namely lower rotational speed thresholds n1, n3 and upper rotational speed thresholds n2, n4, wherein n1 and n2 apply for negative blade angle adjustment rates and n3, n4 for positive blade angle adjustment rates.

After applying the limit characteristic line 52, a blade angle adjustment rate limit G' is provided, which represents a limit for a minimal pitch rate or respectively blade angle adjustment rate in °/s. It is monitored or respectively ensured by the blade angle adjustment rate limit adjustment limit 53 that the blade angle adjustment rate limit is not changed too quickly. This is accomplished by querying the permissible limit adjustment df in the case of a falling ramp as well as the permissible adjustment ds in the case of an increasing ramp. It is hereby important, in particular for the secure operation of the wind power plant, that in the case of a falling ramp the blade angle adjustment rate limit may only be adjusted very slowly, since it can just be excluded in any case that a rapid rotational speed increase or respectively a quick rotational speed increase, which was caused by a faulty operating control, leads to a safety-critical, namely very low, limit for the blade adjustment rate. A change in the direction of an increasing ramp must, however, be implemented relatively quickly in order to ensure system safety. Two vastly differing parameters in terms of absolute values are hereby entered or respectively pre-set, namely ds, which represents a parameter for an increasing ramp and is for example +1.000°/s². This parameter can preferably lie in a range between 0.1 and 2.000°/s². The further value df is a parameter for a falling ramp and lies for example at 0.015°/s² and lies in particular preferably between −0.005°/s² and 0.05°/s².

The following query is performed in the blade angle adjustment rate limit adjustment limit 53: for G'−G<df, $G_{new}$=G+df, otherwise for G'−G>ds:$G_{new}$=G+ds, otherwise $G_{new}$=G, i.e. G' was already in the permissible range and is applied. The determined value $G_{new}$ is output as new value G and is then applied in the block limitation of the blade angle adjustment rate 54.

The blade angle adjustment rate limit G is related with a control signal $\vartheta$ i', $\dot{\vartheta}$ i' given by the blade position regulation or control device 55 so that a limit of the control signals $\vartheta$ i, $\dot{\vartheta}$ i' is provided through application of the blade angle adjustment rate limit G of the blade angle adjustment rate device 39 as output of the block limitation of the blade angle adjustment rate 54. The control signal $\vartheta$ i', $\dot{\vartheta}$ i' itself results through the conventional and existing control or regulation in that a nominal value $\vartheta$ s is given by the operating control 56 and is compared with an actual value of the blade angle $\vartheta$ determined by the blade angle determination device 57 and the result of the blade position regulation or control device 55 is provided. This then determines the control signal $\vartheta$ i' and $\dot{\vartheta}$ i' in order to adjust the blade angle actual value $\vartheta$ to the setpoint value $\vartheta$ s, which is passed to the block limitation of the blade angle adjustment rate 54.

The rotational speed calculation 50, the rotational speed filter 51, the limit characteristic line 52 and the blade angle adjustment rate limit adjustment limit 53 can be an integral part of a control or regulation device 42. An interface with or respectively an integration into the existing regulation then takes place at the interface between the blade angle adjustment rate limit adjustment limit 53 and the limitation of the blade angle adjustment rate 54.

The filter in 51, for example designed as PT1 element, serves to filter the rotational speed n. Signal disruptions and a part of the dynamic rotational speed behavior are hereby filtered out. The filter time must not be too large so that the characteristic line component or respectively the application of the limit characteristic line 52 can adjust the method sufficiently quickly to a blade angle adjustment rate limit G according to the rotational speed. In order to avoid errors, it can be provided that approximately equal rotational speed values must be determined over several, e.g. three, measurement cycles before it is forwarded to block 52.

The blade angle adjustment rate limit adjustment limit 53 or respectively the corresponding ramp component permits the quick reduction in the absolute value of the blade angle adjustment rate limit, that is for example from −3.5°/s towards −1.0°/s. The return path for increasing the absolute value of the blade angle adjustment rate limit, that is for example from −1.5°/s to −3.5°/s, is delayed with a small pitch such that the negative blade angle adjustment rate remains throttled long enough in the case of a so-called "pitch run away scenario" at low rotational speeds of the drive train. This sort of disturbance of the "pitch run away" can take, for example 20 s, which is not problematic in the case of the provided ramp with the specified parameters.

In addition to the blade angle adjustment rate limitation with G' or respectively, a limitation with a permanently pre-settable maximal and/or minimal blade angle adjustment rate of for example +6.5°/s and −6.5°/s also takes place in block 54. The thus-limited control signal $\vartheta$ i, $\dot{\vartheta}$ i is then provided to the blade adjustment device 39. In a particularly compact embodiment of the invention, the components 50 through 54 are integrated in the blade position regulation or control device 55. In an even more compact and thus advantageous embodiment, the blade position regulation or control device 55 is also integrated into the blade angle adjustment device 39. For example, the method can be implemented as an algorithm in the software of the converter for controlling the blade adjustment drives or respectively parts of the method, wherein the corresponding software also performs the capturing and processing of the measurement values of the rotational speed sensor 34'.

Figure 3:
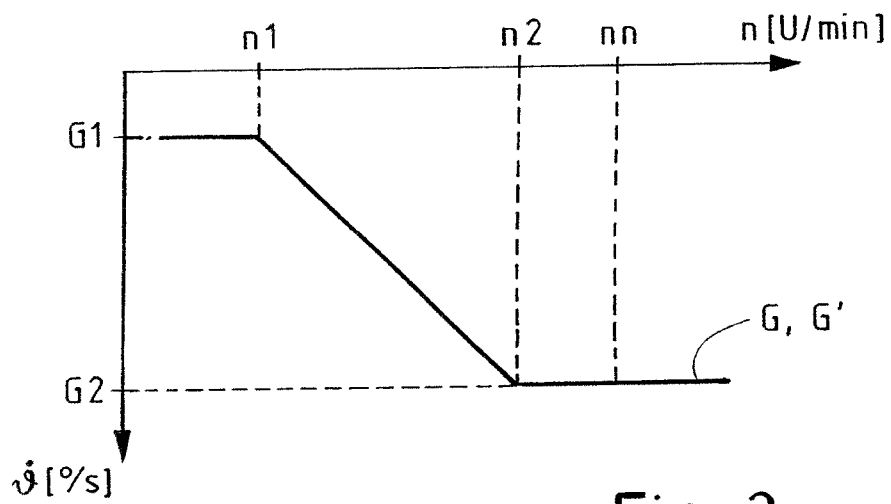
FIG. 3 a schematic characteristic line according to the invention for negative blade angle adjustment rates, FIG. 4 another schematic representation of characteristic lines according to the invention for negative blade angle adjustment rates, and FIG. 5 a schematic representation of three characteristic lines according to the invention for positive blade angle adjustment rates.
Figure 4:
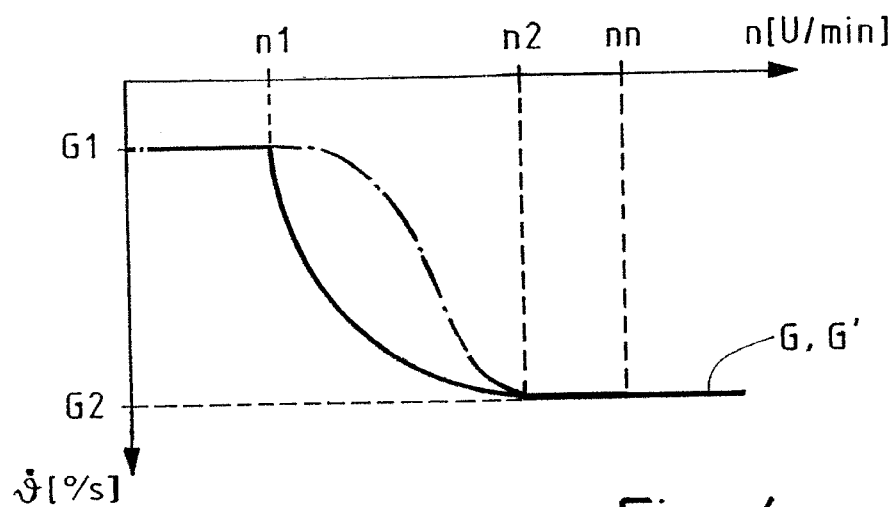
Figure 5:
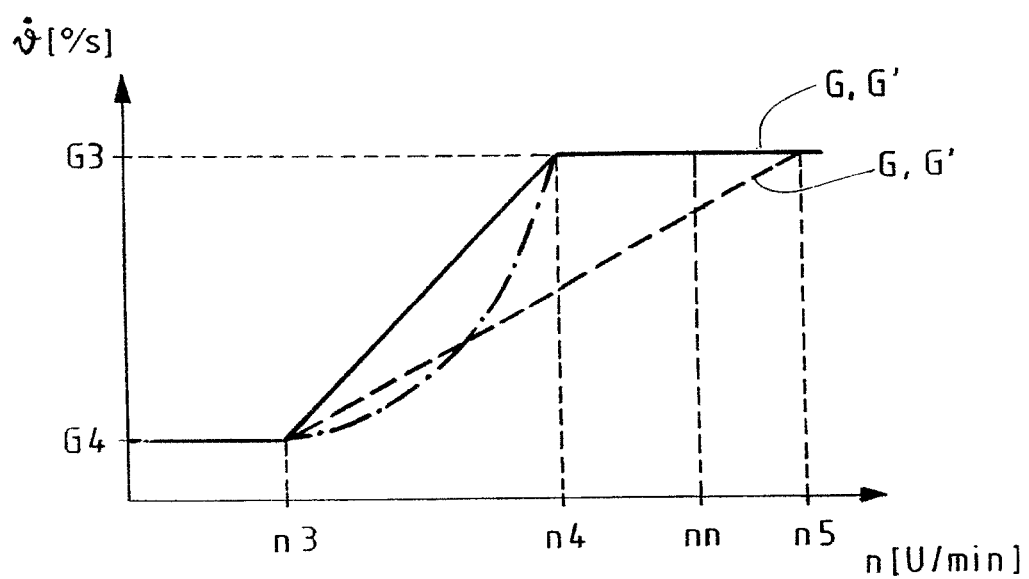

The characteristic line component or respectively the limit characteristic line 52 is represented in greater detail in FIGS. 3 through 5. First regarding FIG. 3, in which a characteristic line of the blade adjustment rate limit is represented in $\dot{\vartheta}$ '°/s depending on the rotational speed n in revolutions/min. An upper blade angle adjustment rate limit G1 and a lower blade angle adjustment rate limit G2 are represented. A limit above the upper blade angle adjustment rate limit G1 and below the lower blade angle adjustment rate limit G2 are not provided since they cannot occur in a functioning operating state. Corresponding blade angle adjustment rate limit plateaus in the amount of G1 actually exist below a lower limit speed n1 and accordingly a plateau in the amount of G2 above an upper limit speed n2. The positive blade angle adjustment rate can be designed without a limit and vice versa in the case of a specified negative blade angle adjustment rate limit.

The upper rotational speed threshold n2 preferably lies in a range between 5% through 10% below the nominal rotational speed nn. The shown characteristic line for the blade angle adjustment rate limit G or respectively G' defines the negative blade angle adjustment rate limits, which are feasible according to the invention, depending on the current rotational speed n. Thus, errors from the operating control with a high blade angle adjustment rate towards 0° are prevented such that the wind power plant can be controlled by a reduced negative blade angle adjustment rate via an existing rotational speed monitor, for example one that generates a corresponding overspeed signal on the fast shaft at 1,950 rpm (at a nominal rotational speed of 1,800 rpm).

The label G, G' for the blade angle adjustment rate limit determined from the measured rotational speed indicates that for one, as explained for FIG. 2, G' can be specified, wherein the module blade angle adjustment rate limit adjustment limit 53 can still be used on G' to form G. Alternatively, G can be obtained directly from the characteristic line and can be used directly as the limit when module 53 is omitted. However, the use of module 53 is very advantageous in order to prevent the "pitch run away" load scenario.

The blade angle adjustment rate is adjusted accordingly to the rotational speed increase, which is determined by the moment of inertia and the power supplied to the grid. In the case of measured rotational speeds above or below the supporting points n1 and n2, the corresponding associated limits G1 and G1 are output. The linear relation in between n1 and n2 represents a simple case.

FIG. 4 shows a quadratic functionality in between n1 and n2 (solid line) and also a function, which has a third order polynomial, for example with a 3rd power. Accordingly, a Taylor expansion series can also be provided, which is terminated after the second or third term or a characteristic line in the form of any frequency polygon or another mathematical function, which is stored e.g. in the form of a value table in a memory. The optimal progression of such a characteristic line is preferably determined through dynamic simulation calculations, which are known in the state of the art.

In contrast, FIG. 5 shows three different characteristic lines at positive blade angle adjustment rates $\dot{\vartheta}$. Four rotational speed thresholds are shown, namely one lower rotational speed threshold n3 and two upper rotational speed thresholds n4 and n5, n3 and n4 lie below the nominal rotational speed of the wind power plant, whereas n5 lies above the nominal rotational speed of the wind power plant. Furthermore, a lower blade angle adjustment rate limit G4 is specified and an upper blade angle adjustment rate limit G3. There can be a linear relation in a characteristic line in between n3 and n4, which is shown as a solid line. Accordingly, the dash-dotted line represents a quadratic relation or respectively a curve, which has at least a quadratic portion and, if applicable, also a linear portion.

The dash-dotted line serves as a limit characteristic line for example when a rotational-speed-reduced operation is provided at high wind speeds in order to minimize noise. The dashed line provides that the upper blade angle adjustment rate limit is only reached at a rotational speed n5 above the nominal rotational speed nn. A smoother regulation is hereby enabled, which can for example be used in high pressure weather conditions. However, it can also be provided to provide an even higher value than the upper blade angle adjustment rate limit G3, subsequent to the upper limit speed n4, before the nominal rotational speed nn is reached in order to enable a faster regulation.

Since, according to the invention, a very tight coupling is provided between the rotational speed and the blade angle adjustment rate limit, a secure operating control of the wind power plant is possible. A determination of the rotational speed in the % range is hereby sufficient so that errors in the calculation of the rotational speed does not negatively impact the security of the operating control.

When the nominal rotational speed is reached, the provision of the blade angle adjustment rate limits is preferably not restrictive for the conventional operating control. The method according to the invention is also not disruptive in partial load mode, since there the blade angle adjustment regulator or respectively the blade angle adjustment controller is set to 0° and thus no change needs to be made. The method according to the invention preferably only comes into action in the case of process-dependent deliberate reductions that impact the rotational speed. In modern wind power plants, this only occurs for example at an approx. 40% power reduction, since the nominal rotational speed is first abandoned at this point.

It is also preferred to provide a redundant design of the method according to the invention in that it is implemented in addition to the implementation in the control or regulation device 42 also in the converter for controlling the blade adjustment drives, that is within the blade angle adjustment device 39. This results in a particularly secure operation of the wind power plant. Furthermore, it can be advantageous to implement the method according to the invention additionally in the operating control 56 in order to prevent error messages when the blade feathering through the blade angle adjustment rate limit takes place slower than provided by the operating control system. Thus, operating control system 56 and blade angle adjustment device 39 would advantageously work together synchronously and can monitor each other, which enables an even more secure operation of the system. The method according to the invention preferably takes place in a 12 ms or if applicable in a 6 ms cycle in order to reduce the blade angle adjustment rate limit. Other cycles, e.g. between 20 ms and 1 ms, can also be used. It can also be provided that over three task cycles, that is over three times for example 12 ms, an approximately equal blade angle adjustment rate limit must be determined before it is forwarded to the blade angle adjustment device 39 in order to avoid errors. Should correspondingly large deviations occur, for example in particular in the case of deviations from average values, a warning can be output to a monitoring center.

LIST OF REFERENCES

9 Rotor
10 Rotor blade
11 Wind power plant
12 Shaft
14 Bearing
16 Bearing
18 Gear box
20 Output shaft
22 Coupling
24 Shaft
26 Generator
28 Locking disk
30 Locking element
32 Transmitter disk
34, 34' Sensor arrangement
36 Computer
38 Converter
39 Blade angle adjustment device
41 Rotor hub
42 Control or regulation device
43 Blade angle adjustment rate limit determination device
44 Adjustment module
50 Rotational speed calculation
51 Rotational speed filter
52 Limit characteristic line
53 Blade angle adjustment rate limit adjustment limit
54 Limitation of the blade angle adjustment rate
55 Blade position regulation or control device
56 Operating control
57 Blade angle determination device
nei i$^{th}$ input signal for rotational speed
n Rotor speed
n1, n3 Lower rotational speed threshold
n2, n4 Upper rotational speed threshold
nn Nominal rotational speed
$\vartheta$ i, $\vartheta$ i' Control signal for blade angle
$\dot{\vartheta}$ i, $\dot{\vartheta}$ i' Control signal for blade angle adjustment rate
$\vartheta$ Blade angle
$\dot{\vartheta}$ Blade angle adjustment rate G, G' Blade angle adjustment rate limit
G1 Upper blade angle adjustment rate limit for negative blade angle adjustment rates
G2 Lower blade angle adjustment rate limit for negative blade angle adjustment rates
G3 Upper blade angle adjustment rate limit for positive blade angle adjustment rate
G4 Lower blade angle adjustment rate limit for positive blade angle adjustment rate
k Constant
na Averaged rotational speed
ds Parameter—Rising of the ramp
df Parameter—Falling of the ramp

The invention claimed is:

1. A method for the operation of a wind power plant (11) with a rotor (9), which has at least one rotor blade (10), comprising the steps of:
rotating at least one part of the rotor blade (10) around a longitudinal axis of the rotor blade (10) by a blade angle ($\vartheta$),
wherein the rotation of the at least one part of the rotor blade (10) occurs with a pre-settable blade angle adjustment rate ($\dot{\vartheta}$),
wherein the rotor (9) is operated speed variably and wherein the blade angle adjustment rate ($\dot{\vartheta}$) is restricted by a pre-settable blade angle adjustment rate limit (G, G', G1-G4), and
wherein a variable blade angle adjustment rate limit (G, G', G1-G4), is changed depending on at least one operating parameter of the wind power plant (11)
wherein via a blade angle adjustment rate limit adjustment limit, a value of the adjustment rate of the blade angle adjustment rate limit (G) is reduced or restricted.

2. The method according to claim 1, wherein the blade angle adjustment rate limit (G, G', G1-G4) is determined before or with its adjustment.

3. The method according to claim 1, wherein a variable blade angle adjustment rate limit (G1, G2) is provided for a negative blade angle adjustment rate ($\dot{\vartheta}$).

4. The method according to claim 1, wherein a first variable blade angle adjustment rate limit (G3, G4) is provided for a positive blade angle adjustment rate ($\dot{\vartheta}$) and a second variable blade angle adjustment rate limit (G1, G2) is provided for a negative blade angle adjustment rate ($\dot{\vartheta}$).

5. The method according to claim 4, wherein the absolute values of the first and the second variable blade angle adjustment rate limit (G, G', G1-G4) are different at the same rotor rotational speed.

6. The method according to claim 1, wherein at negative blade angle adjustment rates ($\dot{\vartheta}$) a characteristic line of the blade angle adjustment rate limit (G, G', G1-G4) is provided depending on the rotational speed (n),
wherein a highest blade angle adjustment rate limit (G1) is provided below a lower pre-settable limit speed (n1) and a lowest blade angle adjustment rate limit (G2) is provided above an upper pre-settable limit speed (n2), and
wherein a constant characteristic line is provided between the highest and the lowest blade angle adjustment rate limit (G1, G2).

7. The method according to claim 6, wherein a linear and/or quadratic characteristic line is provided between the highest and the lowest blade angle adjustment rate limit (G1, G2) or a linear and/or quadratic portion is present in the characteristic line.

8. The method according to claim 1, wherein the at least one operating parameter of the wind power plant is the rotor rotational speed (n) and further comprising the step of performing a rotational speed capture in a rotor hub (41) of the wind power plant (11).

9. The method according to claim 1, wherein the at least one operating parameter of the wind power plant is the rotor rotational speed (n) and the rotor rotational speed (n) is filtered for the determination of the variable blade angle adjustment rate limit (G, G', G1-G4).

10. The method according to claim 1, wherein at negative blade angle adjustment rates ($\dot{\vartheta}$), the highest blade angle adjustment rate limit (G1, G3) in terms of absolute values is between 3% through 15%, below the nominal rotational speed (nn) of the wind power plant (11) and towards higher rotational speeds (n).

11. The method according to claim 6, wherein the blade angle adjustment rate limit determined via the characteristic line is not directly the current blade angle adjustment rate limit, but rather a value that lies between the blade angle adjustment rate limit determined form the characteristic line and a previous blade angle adjustment rate limit.

12. The method according to claim 1, wherein the at least one operating parameter of the wind power plant is the rotor rotational speed (n) and wherein in the case of a deviation of the rotational speed from a nominal rotational speed (nn), the blade angle adjustment rate limit (G, G') is adjusted without causing a reduction in the rotational speed deviation.

13. The method according to claim 1, wherein the at least one operating parameter of the wind power plant is the rotor rotational speed (n) and wherein in the case of a deviation of the rotational speed from a nominal rotational speed (nn), the blade angle adjustment rate limit (G, G') is adjusted such that a permissible blade angle adjustment rate ($\dot{\vartheta}$) is restricted or limited in order to reach the nominal rotational speed (nn).

14. The method of claim 1, wherein the at least one operating parameter of the wind power plant is the rotor rotational speed (n) and/or at least one environmental parameter.

15. The method of claim 14, wherein the at least one operating parameter is the rotor rotational speed (n).

16. The method of claim 12, wherein the deviation of the rotational speed from a nominal rotational speed is a shortfall of the nominal rotational speed (nn).

17. The method of claim 13, wherein the deviation of the rotational speed from a nominal rotational speed is a shortfall of the nominal rotational speed (nn).

18. A non-transitory machine readable medium encoded with program code that causes a control or regulation device (42) of a wind power plant (11) to execute the method according to claim 1.

19. A wind power plant (11) comprising:
a rotor (9), which has at least one rotor blade (10),
wherein at least one part of the rotor blade (10) is rotatable around a longitudinal axis of the rotor blade (10) by a blade angle ($\vartheta$),
wherein a blade angle adjustment rate ($\dot{\vartheta}$) is pre-settable and the blade angle adjustment rate ($\dot{\vartheta}$) is restricted by a blade angle adjustment rate limit (G, G', G1-G4),
wherein a control or regulation device (42) is provided for the blade angle adjustment rate ($\dot{\vartheta}$), in which the blade angle adjustment rate limit (G, G', G1-G4) is provided as a variable blade angle adjustment rate limit (G, G', G1-G4), which will be or is adjusted depending on the rotor rotational speed (n)

wherein an adjustment module (44) is provided for the blade angle adjustment rate limit (G, G', G1-G4), by means of which a value of the increase of the blade angle adjustment rate ($\dot{\vartheta}$) is reducible and by means of which a value of the adjustment rate of the blade angle adjustment rate limit (G) is reducible or restricted.

20. The wind power plant according to claim 19, wherein the control or regulation device (42) has a blade angle adjustment rate limit determination device (43).

21. The wind power plant according to claim 20, wherein the blade angle adjustment rate limit determination device (43) has a characteristic line of the blade angle adjustment rate limit (G, G', G1-G4) depending on the rotational speed (n) of the wind power plant.

22. The wind power plant according to claim 19, wherein a rotational speed capturing device (34) is provided.

23. The wind power plant according to claim 19, wherein a filter is provided for a measured rotor rotational speed (n).

24. The wind power plant of claim 22, wherein the rotational speed capturing device (34) is provided in or on the rotor hub (41).

* * * * *